United States Patent [19]
Sternberg

[11] 3,883,448
[45] May 13, 1975

[54] RECOVERY AND PURIFICATION OF PROTEIN

[75] Inventor: Moshe Sternberg, South Bend, Ind.

[73] Assignee: Miles Laboratories, Inc., Elkhart, Ind.

[22] Filed: Apr. 23, 1973

[21] Appl. No.: 353,895

[52] U.S. Cl............... 260/8; 260/112 R; 260/121; 260/122
[51] Int. Cl. .................................. A23j 1/20
[58] Field of Search............ 260/112 R, 121, 8, 122

[56] References Cited
UNITED STATES PATENTS

| | | | |
|---|---|---|---|
| 2,023,014 | 12/1935 | Flanigan et al. | 260/122 UX |
| 2,377,624 | 6/1945 | Gordon | 260/112 |
| 2,555,514 | 6/1951 | Sharp et al. | 260/122 X |
| 3,252,961 | 5/1966 | Rodgers et al. | 260/112 R |
| 3,404,142 | 10/1968 | Shank et al. | 260/112 R |
| 3,407,076 | 10/1968 | Ganz | 260/112 X |
| 3,685,998 | 8/1972 | Miller | 260/8 X |
| 3,734,734 | 5/1973 | Halpern et al. | 260/112 X |
| 3,749,581 | 7/1973 | Sakita et al. | 260/112 R X |

*Primary Examiner*—Howard E. Schain
*Attorney, Agent, or Firm*—L. E. Davidson

[57] ABSTRACT

Protein can be recovered in a purified form from cheese whey solutions by mixing a protein-containing cheese whey solution with a polycarboxylic acid, such as a polyacrylic acid, a hydrolyzed ethylene-maleic anhydride copolymer or a hydrolyzed methyl vinyl ether-maleic anhydride copolymer, to form a precipitate with the protein. The resulting precipitate is then separated from the remaining solution.

2 Claims, No Drawings

RECOVERY AND PURIFICATION OF PROTEIN

BACKGROUND AND PRIOR ART

In the generally practiced art of cheesemaking, milk is clotted or coagulated by means of a clotting enzyme, such as rennin, to form a curd, the curd is cut into multiple pieces and the pieces are collectively cooked. The liquid whey is then separated from the cooked curd which is then subsequently processed to form the desired cheese product. The resulting liquid whey is a principal by-product from the manufacture of cheese and is composed mainly of lactose, proteins, non-proteinaceous nitrogen-containing compounds, inorganic salts and water. The protein constituent of cheese whey would be a valuable item of commerce if it could be separately recovered. Considerable efforts have been made in the past to recover commercial quantities of lactose from cheese whey and such efforts have been moderately successful. These efforts have not allowed the valuable protein to be recovered in any practical amounts. The attempts previously tried to recover the protein from cheese whey have included precipitation techniques and temperature conditions which have either undesirably denatured the protein or have produced precipitates that are difficult to recover. Ultrafiltration and electrodialysis techniques have also been proposed, but these are quite expensive and require undesirably long processing time.

SUMMARY OF THE INVENTION

In accordance with the present invention, a process is provided for the isolation and purification of protein from cheese whey solutions which comprises mixing a cheese whey solution with a polycarboxylic acid selected from the class consisting of polyacrylic acid, hydrolyzed ethylene-maleic anhydride copolymers and hydrolyzed methyl vinyl ether -maleic anhydride copolymers at a pH from about 3 to about 4.5 to form a precipitate between the protein in the cheese whey solution and the polycarboxylic acid, and then separating the resulting precipitate from the remaining cheese whey solution.

DESCRIPTION OF THE PREFERRED EMBODIMENTS

The cheese whey solutions employed as the raw material for the process of the present invention are well-known materials and are obtained in a well-known manner from the manufacture of cheese, such as from the manufacture of cheddar cheese, cottage cheese, swiss cheese and the like.

The polycarboxylic acids useful in the present invention are the polyacrylic acids, the hydrolyzed ethylene -maleic anhydride copolymers and the hydrolyzed methyl vinyl ether-maleic anhydride copolymers. These polyacrylic acids are well-known in the art and are prepared by polymerization of acrylic acid or acrylic acid derivatives, such as acrylamide or acrylic esters, with subsequent hydrolysis to generate free carboxyl groups. The expression "polyacrylic acids" is also intended to include polymethacrylic acids and salts of polyacrylic acids, such as the sodium and ammonium salts. Suitable polyacrylic acids are marketed by the B. F. Goodrich Chemicals Co. under the tradenames Carbopol 934, 940, 941, 960 and 961 and Goodrite K-702 and K-714. These finely-divided solid materials or liquids are all soluble or readily dispersible in water.

The ethylene-maleic anhydride copolymers useful in the present invention are well-known and are commercially available from Monsanto Chemical Co. under the trademark "EMA" as linear resins in the forms of the free acid and the anhydride. The free acid form has been hydrolyzed by the manufacturer and is soluble in water. The anhydride form is generally insoluble in water, but it conveniently dissolves with heating to produce the free acid form by hydrolysis. Useful commercial products are EMA 11, 21, 22, 31 and 61.

The methyl vinyl ether-maleic anhydride copolymers useful in the present invention are well-known and are commercially available from General Aniline and Film Corp. under the trademark "GANTREZ". They are soluble in water and slowly hydrolyze to form the free acid. Useful commercial products are GANTREZ AN 119, AN 139 and AN 169.

In the practice of this invention an aqueous cheese whey solution is mixed with a solution of the polycarboxylic acid. The polycarboxylic acid is employed in an amount such that the resulting mixture contains from about 0.1 to about 1 percent (weight/volume basis) polycarboxylic acid based on the total volume of the mixture. The pH of the cheese whey solution should be in the range of from about 3 to about 4.5 when it is mixed with the polycarboxylic acid. When the pH is outside this range, formation of the desired precipitate is poor. Preferably the pH is from 3.5 to 4.5. A mixing temperature for the polycarboxylic acid and the whey solution should be below about 30°C. Temperatures above 30°C. decrease the protein recovery. A mixing time of from about 30 minutes to about 90 minutes is also suitable.

The above-prepared protein-polycarboxylic acid precipitate can be separated by filtration, centrifugation or other convenient means from the remaining cheese whey solution. The resulting solid material can be dried by convenient means and used in the dry form for its protein content. If the protein is to be employed in human or animal foods, it is desirable to remove all traces of polycarboxylic acid. The protein-polycarboxylic acid precipitate complex is dissolved by mixing it with an aqueous medium having a pH between about 6 and about 9. To the resulting solution is then added a suitable metal salt which is sufficiently soluble in water so as to react with the polycarboxylic acid. Such metal salt is a calcium salt, such as calcium carbonate, calcium acetate, calcium chloride, calcium oxide and the like, a magnesium salt, such as magnesium acetate, magnesium chloride and the like, a barium salt, such as barium acetate, barium chloride, barium oxide and the like, or an aluminum salt, such as aluminum potassium sulfate, aluminum sulfate and the like. The added metal salt can also be employed to provide the necessary pH conditions within the range from about 6 to about 9. These added materials can form a solid complex at pH values above about 6 with the polycarboxylic acid, and the resulting complex can be separated from the purified protein solution. The resulting highly purified protein solution can be used "as-is" or it can be dried by convenent means, such as spray-drying techniques, for further use.

The protein material isolated by the process of the present invention consists primarily of alpha lactalbumin and beta lactoglobulin. It is substantially free of other nitrogen-containing compounds, such as peptides and urea, that may be present in the cheese whey.

The polycarboxylic acid can be recovered for reuse in the process. The above-produced metal salt-polycarboxylic acid complex is slurried in water and is treated with a stoichiometric amount of an acid, such as sulfuric acid, which is stronger than the polycarboxylic acid. This will displace the polycarboxylic acid from the complex and will form a salt between the metal cation of the complex and the added acid. If this formed salt is insoluble, such as the calcium sulfate formed between a calcium cation and added sulfuric acid, the resulting precipitate is separated from the polycarboxylic acid solution prior to its reuse. If this formed salt is soluble, such as the magnesium salt formed between a magnesium cation and added sulfuric acid, the resulting solution mixture of soluble salt and polycarboxylic acid can be reused to recover protein. When the protein-polycarboxylic complex precipitate is formed and is separated from the soluble impurities, the above-formed soluble salt is thus discharged in the waste.

The invention will be further described in the following illustrative examples.

EXAMPLE 1

A 1.5 liters portion of cheese whey solution obtained from the manufacture of cottage cheese was adjusted to pH 4 with phosphoric acid and was mixed at 23°C. with 37.5 ml. of a 5 weight percent aqueous solution of Goodrite K-702, which is a polyacrylic acid having an average molecular weight of about 80,000 to 110,000 and is marketed by the B. F. Goodrich Chemicals Co. The concentration of polyacrylic acid in the resulting mixture was 0.125 percent (weight/volume basis). This mixture was then agitated for 1 hour during which time a precipitate formed. The supernatant liquor was decanted, and the precipitate was filtered and washed with 20 ml. of water. The filter cake was suspended in 300 ml. of water and was mixed for 1 hour with 4.5 gm. of calcium carbonate during which time the pH rose to a value above 6.0. The resulting slurry was filtered and the protein solution was freeze dried. This protein powder represented a recovery of 50 weight percent based on total nitrogen analysis. The solids separated from the above protein solution were mixed with 90 ml. of 1 N. sulfuric acid for one hour and the resulting mixture was filtered. The resulting solution of regenerated polyacrylic acid was then reused to recover protein from another portion of fresh cheese whey in the manner described above.

EXAMPLE 2

Sweet whey from cheddar cheese manufacture was allowed to stand overnight. The pH dropped to 4.1 as a consequence of lactic acid production by the activity of the bacterial flora of the whey. A 200 ml. portion of this cheese whey solution at pH 4.1 was mixed at 23°C. with 4 ml. of a 5 weight percent aqueous solution of Goodrite K-714, which is a polyacrylic acid having an average molecular weight of about 180,000 to about 220,000 and is marketed by the B. F. Goodrich Chemicals Co. The concentration of polyacrylic acid in the resulting mixture was 0.1 percent (weight/volume basis). This mixture was then agitated for 1 hour during which time a precipitate formed. The precipitate was separated from the remaining cheese whey by filtration and was suspended in water. It was then mixed with calcium carbonate for 1 hour during which time the pH reached 6.0. The resulting slurry was filtered and the purified isolated protein solution was recovered. This protein was capable of being used in a well-known manner for nutritional purposes.

EXAMPLE 3

A 200 ml. portion of sweet whey from cheddar cheese manufacture having a pH of 4.1 obtained as described in Example 2 above was mixed with polyacrylic acid as described in Example 2. The resulting precipitate was recovered and was suspended in 50 ml. of water, mixed with 200 mg. calcium carbonate and stirred for 1 hour with heating at 50°C. The resulting slurry was filtered and the purified isolated protein solution was recovered. There was a total recovery of protein of 70 percent.

EXAMPLE 4

Acid whey from cottage cheese manufacture was adjusted to pH 4 with phosphoric acid and mixed with a 5 weight percent aqueous solution of Carbopol 934, which is a polyacrylic acid having an average molecular weight of about 3 to 5 million and is marketed by the B. F. Goodrich Chemicals Co. The concentration of polyacrylic acid in the resulting mixture was 0.1 percent (weight/volume basis). The resulting precipitate was collected, suspended in water and maintained at pH 7.5 with calcium hydroxide. The resulting precipitate was separated from the isolated purified protein solution.

While all of the above examples employed a polyacrylic acid to precipitate the protein, it is understood that other polycarboxylic acids disclosed above can also be employed for this purpose.

What is claimed is:

1. A process for isolating and purifying protein from aqueous cheese whey solutions which consists essentially of mixing the cheese whey solution with about 0.1 to about 1.0 percent, (weight/volume basis) based on the total volume of the mixture, of a polycarboxylic acid selected from the class consisting of polyacrylic acid, hydrolyzed ethylene-maleic anhydride copolymers and hydrolyzed methyl vinyl ether-maleic anhydride copolymers at a pH from about 3 to about 4.5 and at a temperature below about 30° C. and for a time from about 30 minutes to about 90 minutes to form a precipitate between the protein in the cheese whey solution and the polycarboxylic acid, and then separating the resulting precipitate from the remaining cheese whey solution.

2. A process according to claim 1 wherein the pH of the cheese whey solution is 3.5 to 4.5.

* * * * *